United States Patent
Nooi

[15] 3,666,796
[45] May 30, 1972

[54] 2,2'-DISULFONATED DIALKYL SULFOXIDES AND SULFONES

[72] Inventor: Jacobus Roelof Nooi, Vlaardingen, Netherlands

[73] Assignee: Lever Brothers Company, New York, N.Y.

[22] Filed: Nov. 7, 1969

[21] Appl. No.: 874,983

Related U.S. Application Data

[63] Continuation-in-part of Ser. No. 824,386, May 8, 1967, abandoned, Continuation of Ser. No. 456,825, May 18, 1965, abandoned.

[52] U.S. Cl. ..........................260/513 R, 252/554, 252/535
[51] Int. Cl. ..........................................................C07c 143/20
[58] Field of Search ...................................260/513 R, 513 B

[56] References Cited

UNITED STATES PATENTS

| | | | |
|---|---|---|---|
| 2,499,377 | 3/1950 | Frazier | 260/513 R |
| 3,275,667 | 9/1966 | Bohunek et al. | 260/513 X |
| 2,799,702 | 7/1957 | Gaertner | 260/513 R |
| 2,103,879 | 12/1937 | Ufer | 260/513 X |
| 2,140,569 | 12/1938 | Ufer et al. | 260/513 X |

FOREIGN PATENTS OR APPLICATIONS

| | | | |
|---|---|---|---|
| 439,177 | 11/1935 | England | 260/513 |

*Primary Examiner*—Leon Zitver
*Assistant Examiner*—L. B. De Cresente
*Attorney*—Brumbaugh, Graves, Donohue & Raymond

[57] ABSTRACT

Detergent compounds which are 2,2'-disulfonated dialkyl sulfoxides and sulfones and which can be prepared by reacting an alpha olefin with a sulfur chloride to form a dichlorinated dialkyl thioether and then subjecting the thioether, in either order, to oxidation to oxidize the sulfur atom to a sulfoxide, sulfone and a mixture thereof and to sulfonation to effect replacement of the chlorine atoms by sulfonate groups.

11 Claims, No Drawings

2,2'-DISULFONATED DIALKYL SULFOXIDES AND SULFONES

This application is a continuation-in-part of my copending U.S. application Ser. No. 824,386, filed May 8, 1969, which in turn is a streamlined continuation application of my U.S. application Ser. No. 456,825, filed May 18, 1965, and now both abandoned.

The invention relates to new sulfonated dialkyl sulfoxides and new sulfonated dialkyl sulfones, in which the sulfonate groups are attached at the two-place (reckoned from the central sulfur atom), and in which the alkyl groups are identical and to their method of preparation.

The products according to the invention are prepared in three or four steps. In the first step olefins are reacted with a sulfur chloride, such as sulfur dichloride or sulfur monochloride, yielding chlorinated thioethers. Sulfur dichloride is preferred. Preferably the olefin should contain six to 18 or six to 16 carbon atoms.

In the chlorinated thioethers the chlorine atoms are replaced by sulfonate groups while the sulfur atom is converted into a sulfoxide or sulfone group. These conversions can be accomplished in several ways and in different order. The chlorinated thioethers obtained in the above-mentioned first step may be oxidized and the chlorinated sulfoxides and/or sulfones thus obtained sulfonated with a water-soluble sulfite such as sodium sulfite. Up to 50 percent excess of sulfite may be used.

Between the oxidation step and the sulfonation step hydrochloric acid may be split off by a treatment with caustic soda. This is, in particular, possible for the sulfones.

It is equally possible to reverse the order of the oxidation and sulfonation steps, i.e., to sulfonate first and then oxidize.

Preferably the base material for the preparation of the compounds is selected from the class of straight-chain olefins, specifically alpha-olefins.

If a method of preparation is chosen whereby the sulfonating step precedes the oxidation step it is imperative that the double bond of the olefins is at the alpha-place. If this is not the case, hydroxylated instead of sulfonated products will be obtained.

The use of technical mixtures of olefins is recommendable from an economic point of view. For instance, an olefin mixture can be used made by polymerization of $C_3$ and $C_4$ olefins. Especially useful are mixtures obtained by the so-called "cracked wax" process or by the "Ziegler polymerization" of ethenes.

The oxidation of the chlorinated thioethers to sulfoxides can for instance be carried out conveniently with concentrated hydrogen peroxide in acetic acid in the presence of sulfuric acid, peracetic acid or NaOCl. With hydrogen peroxide in acetic acid the sulfones can be easily obtained. Oxidation of the sulfonated thioethers to the corresponding sulfoxides can be accomplished with peracetic acid or hydrogen peroxide in acetic acid or formic acid, and to the corresponding sulfones with hydrogen peroxide in acetic acid. However, these are by no means the only methods that can be employed; several others are available, for instance those described by N. Karasch in "Organic Sulphur Compounds" (Pergamon Press, 1961), Vol. 1, pages 154 and 222, and by E.E. Reid in "Organic Chemistry of Bivalent Sulphur" (Chemical Publishing Co. Inc., New York, 1960), Vol. 2, page 64.

The oxidation to the sulfoxides often yields a product in which some sulfide and some sulfone is present, without any adverse effect, however, on the detergent properties.

In fact the oxidation can deliberately be carried out in such a way as to provide a mixture of sulfoxides and sulfones. Several side reactions may occur during the different steps of the preparation of the compounds according to the invention, giving rise to by-products which are still present in the end product if no special steps are taken for purification. This may be done but is unnecessary when the products are used in detergent compositions.

The compounds of the invention have been found to be good surface-active agents which exhibit a low sensitivity to hardness and are useful in detergent compositions. The optimum of detergent activity is to be found when starting from olefins containing eight to 14 carbon atoms.

The sensitivity to Ca-ions and Mg-ions of some of the compounds according to the invention as compared with the prior art sulfide analogs thereof is shown in Table I below. The base material for the preparation of the compounds was straight-chain alpha-olefins. The data in the table have been determined as follows. To 10 ml. solutions containing 1 percent surfactant a 1 percent calcium chloride or magnesium chloride solution was added dropwise at room temperature. The amount of this solution required for a permanent turbidity, even when heated, was noted and recorded in Table I.

The compounds according to the invention are biologically easily degradable.

TABLE I

| Compound, Type | R | Alpha-olefin base material | Use of Ca-ions and Mg-ions solution (1%) in ml. | |
|---|---|---|---|---|
| | | | Ca | Mg |
| Sulfide: | | | | |
| $[RCH(SO_3Na)CH_2]_2S$ | $C_4H_9$ | $C_6H_{12}$ | 2.5 | 6.0 |
| | $C_8H_{17}$ | $C_{10}H_{20}$ | 0.6 | 2.9 |
| | $C_{10}H_{21}$ | $C_{12}H_{24}$ | 0.6 | 3.6 |
| | $C_{14}H_{29}$ | $C_{16}H_{32}$ | 1.5 | 2.2 |
| | $C_{10}H_{21}-C_{14}H_{29}$ | $C_{12}H_{24}-C_{16}H_{32}$ | 0.8 | 1.7 |
| Sulfoxide: | | | | |
| $[RCH(SO_3Na)CH_2]_2SO$ | $C_4H_9$ | $C_6H_{12}$ | >100 | >100 |
| | $C_8H_{17}$ | $C_{10}H_{20}$ | 24.0 | >100 |
| | $C_{10}H_{21}$ | $C_{12}H_{24}$ | 2.8 | >100 |
| | $C_{14}H_{29}$ | $C_{16}H_{32}$ | 1.5 | 2.2 |
| | $C_{10}H_{21}-C_{14}H_{29}$ | $C_{12}H_{24}-C_{16}H_{32}$ | 0.7 | 6.0 |
| Sulfone: | | | | |
| $[RCH(SO_3Na)CH_2]_2SO_2$ | $C_4H_9$ | $C_6H_{12}$ | >100 | >100 |
| | $C_8H_{17}$ | $C_{10}H_{20}$ | >100 | >100 |
| | $C_{10}H_{21}$ | $C_{12}H_{24}$ | 3.0 | >100 |
| | $C_{14}H_{29}$ | $C_{16}H_{32}$ | 1.0 | 8.5 |
| | $C_{10}H_{21}-C_{14}H_{29}$ | $C_{12}H_{24}-C_{16}H_{32}$ | 1.7 | >100 |

The above Table I clearly shows the overall superiority or lower sensitivity to water hardness ions of the compounds according to the invention versus the prior art sulfide analogs thereof.

The compounds of the invention provide good detergency in aqueous solutions, both alone and in the presence of conventional detergent builder salts, such as alkali metal carbonates, silicates, polyphosphates, borates, and mixtures thereof. The presence of conventional detergent builders generally improves the detergency of the compositions. Additional components, such as sodium carboxymethylcellulose, which improves the dirt-suspending properties of the washing solution, and bleaching substances such as perborates, may be used. Also other synthetic detergents, soaps, sulfates, perfumes, abrasives, foam stabilizers, germicidal agents, coloring agents, optical brighteners and the like, may be included. The compounds are effective in hard water.

As already intimated all the compounds prepared according to the processes described above are new. Accordingly, they fall as such within the scope of the invention as well as all detergent compositions in which they are incorporated.

EXAMPLE 1

To a solution of 1 mole dodecene-1 in 200 ml. dry dichloromethane a mixture of 0.5 mole sulfur dichloride and 100 ml. dichloromethane was added in 2 hours at a temperature of −20° C. while being vigorously stirred. After the addition was complete, stirring was continued for a further 30 minutes at −20° C. The solvent was then evaporated in vacuo at a temperature below 25° C. The crude bis (2-chlorododecyl) sulfide, a yellow oil, was obtained in almost quantitative yield. The refractive index ($n_D^{20}$) varied between 1.478 and 1.479.

| Analysis | % Cl | % S |
| --- | --- | --- |
| found | 14.9 | 9.0 |
| calculated | 16.5 | 7.29 |

The yellow oil thus obtained was dissolved in 1,350 ml. acetic acid, and 1 mole 30 percent hydrogen peroxide was added in 30 minutes with stirring. The temperature rose from 20° to 40° C. Subsequently a portion of 2 moles 30 percent hydrogen peroxide was added in 45 minutes and the reaction mixture was heated to 55° C., at which temperature the reaction started again. The mixture was kept at 60° C. for 20 hours. The greater part of the solvent was evaporated in vacuo at a temperature below 25° C.; the residue was taken up in light petroleum and washed acid-free with a sodium hydrogen carbonate solution. After drying with anhydrous sodium sulfate, the solvent was evaporated.

The crude bis (2-chlorododecyl) sulfone was obtained as a slightly yellow oil in a yield of about 90 percent (by crystallization from acetone a solid compound was obtained with a melting point of 50° – 53° C.). The refractive index ($n_D^{20}$) of the crude product varied between 1.468 to 1.478.

The data of sulfones prepared in a similar way from other olefins are given in Table II.

TABLE II

[Bis (2-chloroalkyl) sulfones]

| Alpha-olefin | Yield (percent) | $n_D^{20}$ | Analysis (percent) | | | |
| --- | --- | --- | --- | --- | --- | --- |
| | | | Found | | Calculated | |
| | | | Cl | S | Cl | S |
| $C_6H_{12}$ | [3] 82–90 | [3] 1.4758–1.4850 | 22.3–23.3 | 9.7–10.6 | 23.42 | 10.59 |
| $C_8H_{16}$ | 93 | 1.4758 | 18.0 | 8.0 | 19.76 | 8.93 |
| $C_{10}H_{20}$ | 87–91 | 1.4736–1.4748 | 15.4 | 7.3 | 17.11 | 7.71 |
| $C_{12}H_{24}$ [1] | 76–91 | 1.4683–1.4781 | 12.4–13.9 | 5.6–7.1 | 15.07 | 6.79 |
| $C_{16}H_{32}$ | 79–85 | 1.4750–1.4754 | 10.6–11.3 | 4.9–5.3 | 12.61 | 5.68 |
| $C_nH_{2n}$ [2] (n=12–16) | 76 | | 11.8 | 5.7 | 13.3 | 5.9 |

Notes 1. 66 g. crude sulfone was crystallized twice from acetone; yield 3.5 g.; m.p.: 50°–53° C. Analysis % Cl: 14.4% S = 6.7 The I.R.-spectrum showed no acetate bands.
2. The starting alpha-olefin mixture was of the Ziegler type (ex Gulf Oil Co.) and had the following composition: $C_{12}$ 35%, $C_{14}$ 36%; $C_{16}$ 28%. Unknown 1%.
3. When a range of figures is given, more than one sample has been prepared and analyzed.

The product was heated at reflux temperature with a solution of 3 moles alkali metal sulfite (for instance sodium sulfite) in 1 liter of water for several hours with vigorous stirring. It appeared to be favorable to add 10 percent ($v/v$) propanol-2 and 0.2 g. alpha, alpha'-azobis (isobutyronitrile). The sulfonate could be isolated by crystallization from hot water.

Another method employed for the isolation of the sulfonate consisted in stirring the reaction mixture with an equal volume of 2-methylpropanol-1 while still hot. The layers were separated and after cooling to room temperature a solid product was obtained from the upper alcohol layer by evaporation of the solvent. In this case the nonionic material was removed by washing the preparation with acetone after removal of the isobutanol. The white solid product (Yield about 70 percent) contained about 95 percent sulfonate.

The data of the sulfonates prepared in a similar way starting from other olefins are given in Table III.

TABLE III

[Disodium S, S-dioxo thia alkane disulfonates]

| Derived from alpha-olefin | Reaction time (h) | Yield (percent) | Analysis [1] | | | |
| --- | --- | --- | --- | --- | --- | --- |
| | | | Percent Na | | Percent S | |
| | | | Found | Calculated | Found | Calculated |
| $C_6H_{12}$ | 25 | 37 | | | 20.4 | 21.92 |
| $C_{10}H_{20}$ | 27 | [2] 50 | 9.1 | 8.37 | 16.5 | 17.46 |
| $C_{12}H_{24}$ | 14 | 73 | 9.3 | 7.59 | 15.2 | 15.84 |
| $C_{16}H_{32}$ | 16 | 79 | | | 12.9 | 13.37 |
| $C_nH_{2n}$ (n=12–16) [3] | 24 | 65 | 8.2 | 7.0 | | |

Notes

1. From analysis of some sulfonate samples by means of ion-exchangers it appeared that the amount of inorganic material (sodium chloride, sodium sulfate and sodium sulfite) is generally between 5 and 8 percent.
2. The yield was increased to 68 percent by isobutanol extraction of the mother liquor.
3. The starting alpha-olefin mixture was of the Ziegler type as used herebefore.

EXAMPLE 2

One mole of bis (2-chlorododecyl) sulfone was stirred with a solution of 5 moles sodium hydroxide in 2 liters of water for 25 hours at 90° C. After cooling the reaction mixture was extracted with ether and the ether evaporated from the solution. The resulting oily di-(dodecenyl) sulfone (yield: 90 percent; $n_D^{20}$: 1.4712) was stirred at reflux temperature for 2.5 hours with a solution of 3 moles sodium hydrogen sulfite in 1.5 liters of water to which 1 g. of alpha, alpha'-azobis (isobutyronitrile) was added. The sulfonate was isolated as described in Example 1 (yield appr. 65 percent).

EXAMPLE 3

The addition product prepared from 1 mole alpha-dodecene as described in Example 1 was heated at reflux temperature with a solution of 3 moles sodium sulfite in 1 liter of water for several hours, while being vigorously stirred. It appeared favorable to add 10 percent (v/v) of propanol-2.

Subsequently the reaction mixture was stirred with an equal volume of 2-methylpropanol-1 while still hot. After cooling to room temperature a solid product was obtained from the upper 2-methyl-propanol-1 layer by evaporation of the solvent.

Nonionic material actually present in the sulfonated product was removed by washing it with acetone. A solid white product was obtained with a yield about 70 percent. This product was mixed with 3 liters of glacial acetic acid, after which 1 mole 27 percent hydrogen peroxide was added in 1 hour. When the evolution of heat had ceased, another 2 moles hydrogen peroxide were added and the mixture was stirred for 6 hours at 60° C. After the residual oxidant had been destroyed with the stoichiometric amount of sodium sulfite, the disodium salt of the disulfosulfone was isolated as a white powder by evaporation of the solvent in vacuo (yield appr. 80 percent).

EXAMPLE 4

To the sulfidesulfonate mentioned in the foregoing example (1 mole), dissolved in formic acid, 1 mole 50 percent hydrogen peroxide was added in 1 hour at 0°—5° C. (Acceptable results were also obtained with peracetic acid at 0° C. and with 30 percent hydrogen peroxide in acetic acid at 20° C.). After the hydrogen peroxide had been consumed, another 0.5 mole 50 percent hydrogen peroxide was added and the reaction continued until the concentration of the oxidant remained constant. After the residual oxidant had been destroyed with sodium sulfite, the disodium salt of the disulfosulfoxide was isolated as a white powder by evaporation of the solvent in vacuo (yield appr. 75 percent).

The data of the sulfonates prepared in a similar way starting from other olefins are given in Table IV.

crystallization occurred.
3. Before working up the reaction mixture was stored for an additional 100 hours in the refrigerator (about 5° C.) without stirring.
4. The product was isolated by isobutanol extraction.
5. The starting alpha-olefin mixture was of the Ziegler type as used herebefore.

EXAMPLE 5

The product obtained by reacting alpha-octene with sulfur dichloride as described in Example 1 was mixed with 600 ml. acetic acid, 150 ml. ethanol and 1 ml. sulfuric acid, after which 1.1 mole 85 percent hydrogen peroxide was added with vigorous stirring. The temperature was kept at 0° C. After the addition was complete, the mixture was stirred at 0° C. for another 12 hours. Subsequently the mixture was diluted with ice water and extracted with ether. After drying with anhydrous sodium sulfate the ether was evaporated. A slightly yellow oil was obtained in about 90 percent yield. The sulfoxide content, based on the molecular weight 343 of bis (2-chloro-octyl) sulfoxide and determined by titration with perchloric acid in acetic anhydride, was 80 percent.

Good results were also obtained when using sodium hypochlorite (not containing sodium hydroxide) or preformed peracetic acid.

EXAMPLE 6

Crude bis (2-chlorodecyl)-sulfoxide, prepared by the method described in Example 5, was heated at reflux temperature with a solution of 3 moles sodium sulfite in 1 liter of water. After a reaction time of 90 hours and working up with 2-methylpropanol-1, 50 percent bis(sodium sulfodecyl)-sulfoxide was obtained as a white powder.

EXAMPLE 7

Comparative washing tests were carried out with the sodium salts of the various disulfosulfoxides and disulfosulfones. The results are given in Table V.

TABLE IV
[Oxidation of disodium thia alkane disulfonates to their S-oxo-thia compounds]

| Derived from alpha-olefin | Formic acid (ml.[1]) | Moles, $H_2O_2$ [1] | Temp., °C. | Reaction time (h) | Yield (percent) | Sulfide content (percent) | Percent sulfur Found | Percent sulfur Calculated |
|---|---|---|---|---|---|---|---|---|
| $C_8H_{16}$ | 2,500 | 1.05+0.45 | 0–5 | 24+24 | 79 | 49 | 19.5 | 22.35 |
| $C_{10}H_{20}$ | 3,300 | 1.05+0.45 | 0–5 | 24+24 | 72 | 10 17 | 16.4 | 17.98 |
| $C_{12}H_{24}$ | 3,800 | 1.05+0.40 | 0–5 | 4+6 | 75 | 6 39 | 15.1 | 16.27 |
| $C_{16}H_{32}$ [2] | a 5,000+3,500 | 1.05+0.45 | 10 | 3 6 | 58 | 12 16 | 12.2 | 13.68 |
| $C_nH_{2n}$ [3] (n=12–16) | 6,650 | 2.0+0.9 | 0–5 | 24+3 | 4 65 | 4 8.2 | 15.2 | 15.0 | a Ml. ethanol.

TABLE V
[Washing Efficiencies (percent)]

| Compounds, type | Derived from alpha-olefins | Active Detergent Only 0.5 g., 60° C. | AD/1, 95° C. | 1.0 g., 60° C. | AD/1, 95° C. | Completely Built Detergent 0.5 g., 60° C. | AD/1, 95° C. | 1.0 g., 60° C. | AD/1, 95° C. |
|---|---|---|---|---|---|---|---|---|---|
| Sulfoxide | $C_6H_{12}$ | 26 | 30 | 29 | 34 | 39 | 55 | 45 | 63 |
|  | $C_{10}H_{20}$ | 28 | 30 | 33 | 34 | 40 | 52 | 43 | 69 |
|  | $C_{12}H_{24}$ | 35 | 41 | 45 | 49 | 41 | 64 | 46 | 74 |
|  | $C_{16}H_{32}$ | 29 | 30 | 35 | 34 | 41 | 63 | 43 | 74 |
|  | $C_{12}H_{24}$–$C_{16}H_{32}$ [1] | 33 | 37 | 38 | 42 | 47 | 67 | 50 | 70 |
| Sulfone | $C_6H_{12}$ | 25 | 28 | 26 | 27 | 40 | 46 | 46 | 58 |
|  | $C_{10}H_{20}$ | 31 | 34 | 34 | 36 | 47 | 65 | 56 | 72 |
|  | $C_{12}H_{24}$ | 27 | 36 | 28 | 38 | 34 | 55 | 42 | 72 |
|  | $C_{12}H_{24}$ [2] | 26 | 32 | 28 | 38 | 33 | 45 | 40 | 64 |
|  | $C_{16}H_{32}$ | 29 | 30 | 33 | 36 | 45 | 62 | 46 | 73 |
|  | $C_{12}H_{24}$–$C_{16}H_{32}$ [1] | 38 | 44 | 45 | 47 | 43 | 59 | 50 | 76 |
| Dobs PT |  | 28 | 32 | 35 | 39 | 43 | 57 | 51 | 71 |

Notes
1. Amounts per mole sulfonate.
2. At room temperature the starting material was completely dissolved. However, at the reaction temperature Notes
1. The starting olefin mixture was of the Ziegler type (Gulf Oil Co.) herebefore as used.
2. Prepared from the corresponding thia disulfonate by oxidation with $H_2O_2$ in acetic acid.

The tests were carried out in the launderometer, using standard soiled test pieces at a cloth/liquor ratio of 1:20 under the following conditions:

a. 10 minutes to 60° C. and 15 minutes at 60° C.;
b. 15 minutes to 95° C. and 5 minutes at 95° C.

The washing efficiencies (after 3 washings) were calculated from photometric reflectance measurements on the test pieces.

In the experiments with completely built detergents given in this table for each gram of surfactant 3.5 g./l base powder and 0.5 g./l sodium-perborate were used. The composition of the base powder was as follows:

|  | % by weight |
|---|---|
| Sodium triphosphate | 52.17 |
| Sodium silicate (anhydrous | 15.42 |
| Sodium sulfate | 29.40 |
| Sodium carboxymethylcellulose | 1.66 |
| Perfume | 0.22 |
| Anti-corrosion agent | 1.00 |
| Fluorescer | 0.13 |

What is claimed is:

1. A detergent compound selected from the group consisting of 2,2'-disulfonated dialkyl sulfoxides and sulfones having identical straighttchain alkyl groups of from six to 16 carbon atoms and having alkali meal cations.
2. A compound as defined by claim 1 wherein the alkyl groups have from eight to 14 carbon atoms.
3. A compound as defined by claim 1 wherein the alkyl groups have six carbon atoms.
4. A compound as defined by claim 1 wherein the alkyl groups have eight carbon atoms.
5. A compound as defined by claim 1 wherein the alkyl groups have 10 carbon atoms.
6. A compound as defined by claim 1 wherein the alkyl groups have 12 carbon atoms.
7. A compound as defined by claim 1 wherein the alkyl groups have 14 carbon atoms.
8. A compound as defined by claim 1 wherein the alkyl groups have 16 carbon atoms.
9. A compound as defined by claim 1 wherein the alkali metal cations are sodium cations.
10. A compound as defined by claim 1 which is a sulfoxide.
11. A compound as defined by claim 1 which is a sulfone.

* * * * *

PO-1050
(5/69)

UNITED STATES PATENT OFFICE
CERTIFICATE OF CORRECTION

Patent No. 3,666,796　　　　　　　　　Dated　　May 30, 1972

Inventor(s)　Jacobus Roelof Nooi

It is certified that error appears in the above-identified patent and that said Letters Patent are hereby corrected as shown below:

Cover page, column 1, line 11, "1967" should be -- 1969 --. Column 8, line 3, "straighttchain" should be -- straight-chain --.

Signed and sealed this 26th day of December 1972.

(SEAL)
Attest:

EDWARD M. FLETCHER, JR.　　　　　　　ROBERT GOTTSCHALK
Attesting Officer　　　　　　　　　　　Commissioner of Patents